US012481825B2

(12) United States Patent
Smoot et al.

(10) Patent No.: US 12,481,825 B2
(45) Date of Patent: Nov. 25, 2025

(54) METHOD OF RECOMMENDING EMOTION ICONS

(71) Applicant: INTERNATIONAL BUSINESS MACHINES CORPORATION, Armonk, NY (US)

(72) Inventors: Kara A. Smoot, Baltimore, MD (US); Jennifer M. Hatfield, Portland, OR (US); Kelley Danyi, Virginia Beach, VA (US); Jill S. Dhillon, Jupiter, FL (US); Juhi Bharat, Highland Park, NJ (US); Vinod A. Valecha, Pune (IN); Uma Subbu, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 203 days.

(21) Appl. No.: 18/461,590

(22) Filed: Sep. 6, 2023

(65) Prior Publication Data

US 2025/0077768 A1 Mar. 6, 2025

(51) Int. Cl.
*G06F 40/20* (2020.01)
(52) U.S. Cl.
CPC .................................. *G06F 40/20* (2020.01)
(58) Field of Classification Search
USPC ................................................ 704/8–10, 257
See application file for complete search history.

(56) References Cited

U.S. PATENT DOCUMENTS

| 9,665,567 | B2 | 5/2017 | Liu | |
|---|---|---|---|---|
| 10,318,109 | B2 | 6/2019 | Desjardins | |
| 2017/0185581 | A1 | 6/2017 | Bojja | |
| 2018/0024726 | A1* | 1/2018 | Hviding | G06V 40/174 715/204 |
| 2018/0189628 | A1* | 7/2018 | Kaufmann | G06F 40/56 |
| 2018/0210874 | A1* | 7/2018 | Fuxman | G06N 3/045 |
| 2018/0300542 | A1* | 10/2018 | Waddell | G06V 30/387 |
| 2019/0251152 | A1 | 8/2019 | Leydon | |
| 2020/0301566 | A1 | 9/2020 | Monk | |
| 2021/0141866 | A1 | 5/2021 | Chen | |
| 2022/0269354 | A1 | 8/2022 | Prasad | |
| 2023/0082635 | A1 | 3/2023 | Sushain | |

OTHER PUBLICATIONS

Maney, "Emojis Are Everywhere, But for How Long? Artificial Intelligence Could Soon Replace Our Smiley Face Friends", NewsWeek Magazine, Jul. 29, 2017, 21 Pages. https://www.newsweek.com/2017/08/11/emoji-ai-artificial-intelligence-voice-recognition-alexa-amazon-iphone-643764.html.

* cited by examiner

*Primary Examiner* — Leonard Saint-Cyr
(74) *Attorney, Agent, or Firm* — Steven M. Bouknight (57) ABSTRACT

An embodiment for improved computer-implemented methods of recommending emotion icons. The embodiment may detect text associated with user activity within a connected messaging environment. The embodiment may, in response to detecting the text associated with user activity within the connected messaging environment, determine a context for the detected text based on at least location data, environment data, language context data, and historical data. The embodiment may generate a filtered series of emotion icons based on the context. The embodiment may display the filtered series of emotion icons to a user for selection.

20 Claims, 3 Drawing Sheets

METHOD OF RECOMMENDING EMOTION ICONS

BACKGROUND

The present application relates generally to computer processing, and more particularly, to recommending emotion icons.

Emotion icons, sometimes referred to colloquially as 'emojis' or 'emoticons', have become common tools used for effective digital communication. Emotion icons may provide visual representations of emotions, ideas, and reactions, functioning to add depth and nuance to digital communications. Many messaging environments strive to provide users with a variety of emotion icons sufficient to convey any intended meaning accurately and appropriately. Additionally, users of emotion icons seek frictionless experiences that allow for enhanced clarity and richness within digital communications using such emotion icons.

SUMMARY

According to one embodiment, a method, computer system, and computer program product for performing computer-implemented methods of recommending emotion icons is provided. The embodiment may include detecting text associated with user activity within a connected messaging environment. The embodiment may also include in response to detecting the text associated with user activity within the connected messaging environment, determining a context for the detected text based on at least location data, environment data, language context data, and historical data. The embodiment may further include generating a filtered series of emotion icons based on the context. The embodiment may also include displaying the filtered series of emotion icons to a user for selection.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to computer processing, and more particularly, to recommending emotion icons. The following described exemplary embodiments provide a system, method, and program product to, among other things, detect text associated with user activity within a connected messaging environment, in response to detecting the text associated with user activity within the connected messaging environment, determine a context for the detected text based on at least location data, environment data, language context data, and historical data, generate a filtered series of emotion icons based on the context, and display the filtered series of emotion icons to a user for selection. Therefore, the presently described embodiments have the capacity to methods of recommending emotion icons by leveraging machine learning to process a variety of context data for a given detected text to generate filtered series of emotion icons based on a determined context for the detected text. The filtered series of emotion icons may represent a series of emotion icons predicted to be most appropriate based on the determined context. Thus, described embodiments may provide the ability to address various gaps in information considered when recommending emotion icons, such as, for example, location contexts, societal changes, evolution of common vernacular, historical data, and other available data, to promote a frictionless user experience in which proper emotion icons are recommended to communicate intended meanings of users in an appropriate manner.

As previously described, emotion icons, sometimes referred to colloquially as 'emojis' or 'emoticons', have become common tools used for effective digital communication. Emotion icons may provide visual representations of emotions, ideas, and reactions, functioning to add depth and nuance to digital communications. Many messaging environments strive to provide users with a variety of emotion icons sufficient to convey any intended meaning accurately and appropriately. Additionally, users of emotion icons seek frictionless experiences that allow for enhanced clarity and richness within digital communications using such emotion icons.

However, while emotion icons can enhance the quality of digital conversations, there are also associated risks and challenges to using emotional icons incorrectly. For example, if a messaging environment or user is not current with respect to the meaning of a given emotion icon, including but not limited to, what is communicated by a given emotion icon, the most current appropriate contexts or styles of communication associated with a given emotion icon, or a most common intended meaning for a given emotion icon, then use of an emotion icon may yield negative results ranging from being impolite, to being inappropriate or rude, depending on the relevant context.

Accordingly, a method, computer system, and computer program product for improved recommending of emotion icons would be advantageous. The method, system, and computer program product may detect text associated with user activity within a connected messaging environment. The method, system, computer program product may, in response to detecting the text associated with user activity within the connected messaging environment, determine a context for the detected text based on at least location data, environment data, language context data, and historical data. The method, system, computer program product may then generate a filtered series of emotion icons based on the context. Thereafter, the method, system, computer program product may display the filtered series of emotion icons to a user for selection. In turn, the method, system, computer program product has provided for improved recommending of emotion icons by leveraging machine learning to process a variety of context data for a given detected text to generate filtered series of emotion icons based on a determined context for the detected text. The filtered series of emotion icons may represent a series of emotion icons predicted to be most appropriate based on the determined context. Thus, described embodiments may provide the ability to address various gaps in information considered when recommending emotion icons, such as, for example, location contexts, societal changes, evolution of common vernacular, historical data, and other available data, to promote a frictionless user experience in which proper emotion icons are recommended to communicate intended meanings of users in an appropriate manner. In embodiments, described methods may further include detecting user selection data associated with user-selected emotion icons, and storing the detected user selection data and associated contexts as user feedback that may be leveraged as historical data by described embodiments to improve subsequent determinations of context and most appropriate and relevant recommended emotion icons for a given detected text.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
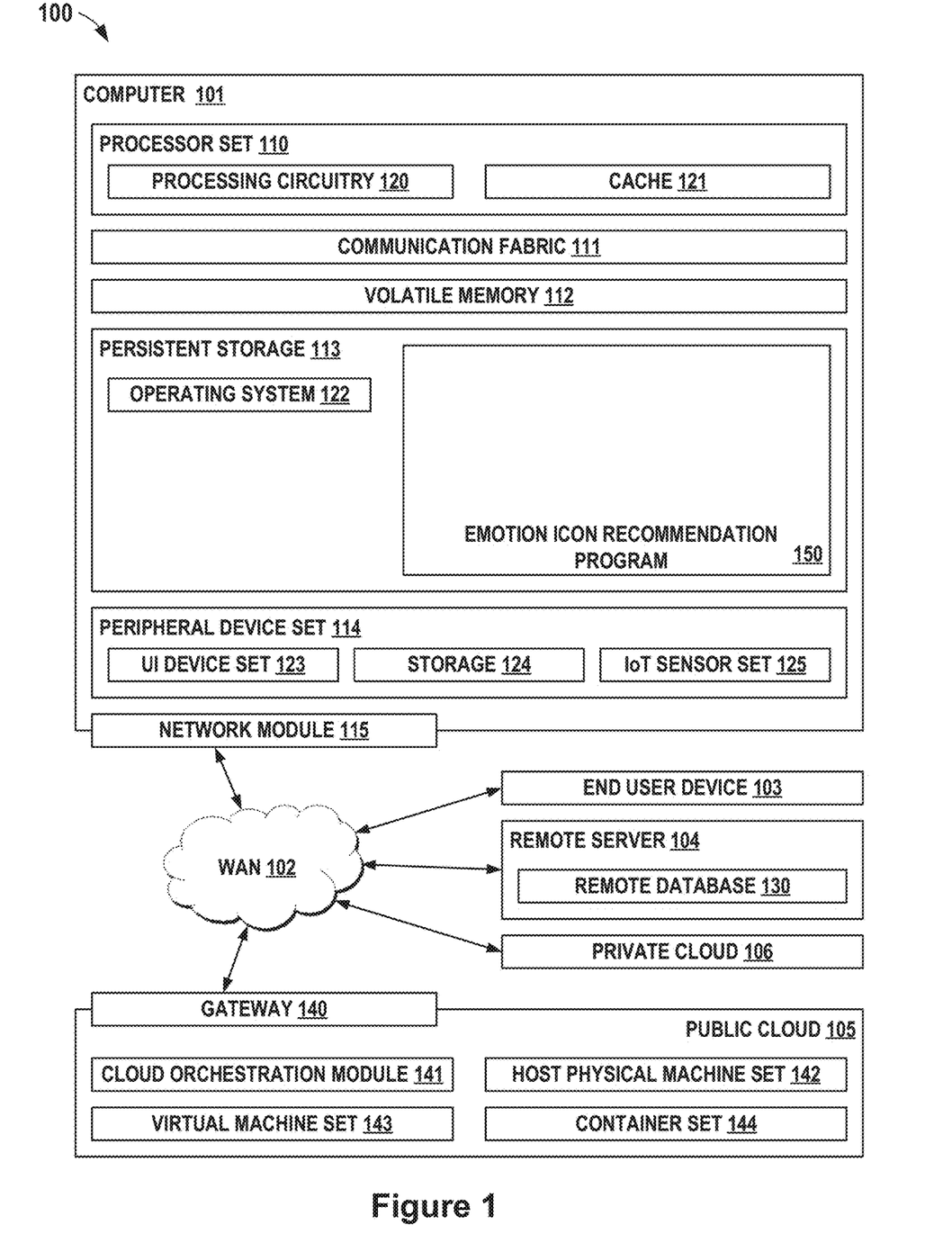
FIG. 1 illustrates an exemplary networked computer environment according to at least one embodiment.

Referring now to FIG. 1, computing environment 100 contains an example of an environment for the execution of at least some of the computer code involved in performing the inventive methods, such as emotion icon recommendation program/code 150. In addition to emotion icon recommendation code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and emotion icon recommendation code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in emotion icon recommendation code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in emotion icon recommendation program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the emotion icon recommendation program 150 may be a program capable of detecting text associated with user activity within a connected messaging environment. Emotion icon recommendation program 150 may then, in response to detecting the text associated with user activity within the connected messaging environment, determine a context for the detected text based on at least location data, environment data, language context data, and historical data. Next, emotion icon recommendation program 150 may generate a filtered series of emotion icons based on the context. Thereafter, emotion icon recommendation program 150 may display the filtered series of emotion icons to a user for selection. In turn, emotion icon recommendation program 150 has provided for improved recommending of emotion icons by leveraging machine learning to process a variety of context data for a given detected text to generate filtered series of emotion icons based on a determined context for the detected text. The filtered series of emotion icons may represent a series of emotion icons predicted to be most appropriate based on the determined context. Thus, described embodiments provide the ability to address various gaps in information considered when recommending emotion icons, such as, for example, location contexts, societal changes, evolution of common vernacular, historical data, and other available data, to promote a frictionless user experience in which proper emotion icons are recommended to communicate intended meanings of users in an appropriate manner. Furthermore, described methods may detect user selection data associated with user-selected emotion icons, and store the detected user selection data and associated contexts as user feedback that may be leveraged as historical data by described embodiments to improve subsequent determinations of context and most appropriate and relevant recommended emotion icons for a given detected text.

Figure 2:
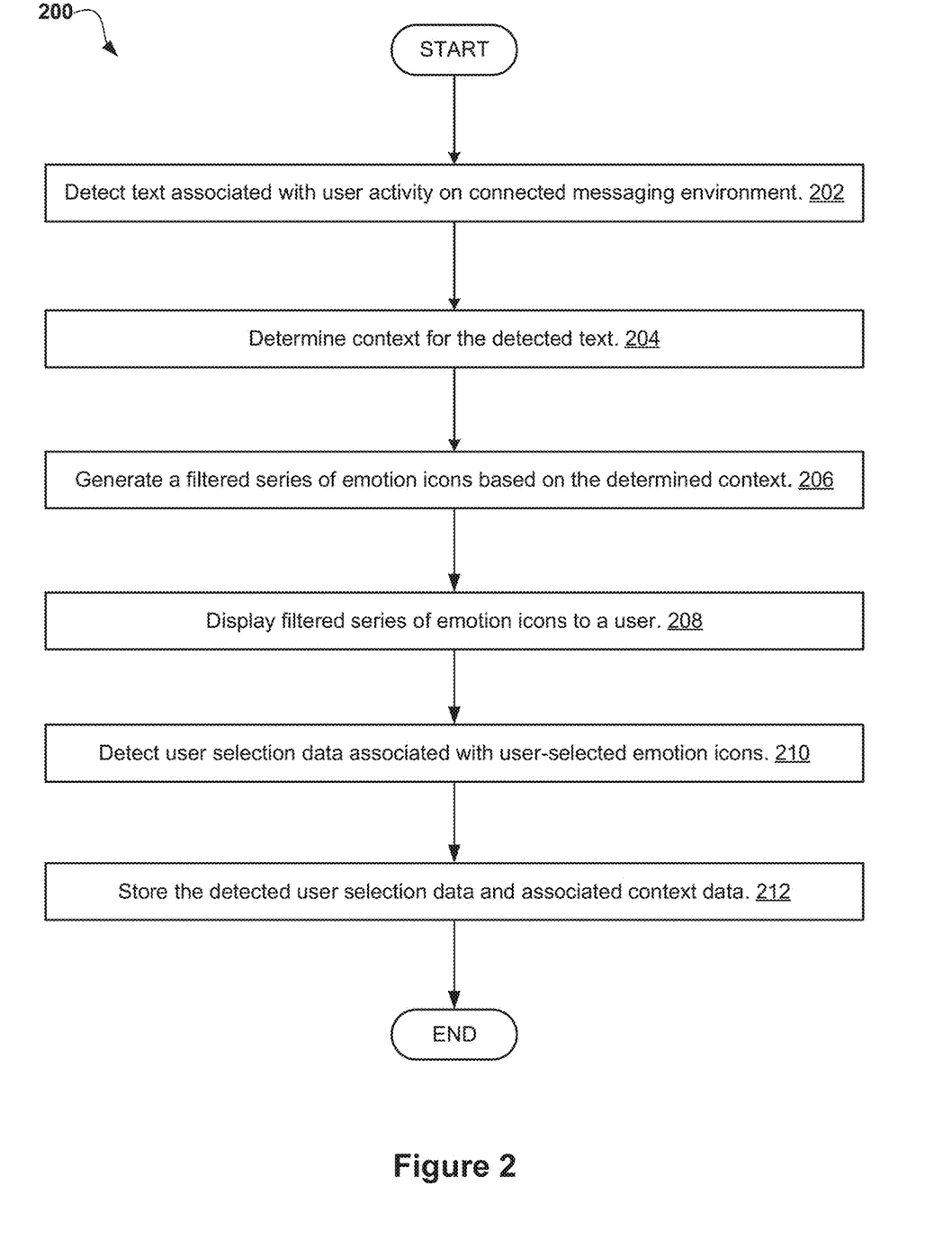
FIG. 2 illustrates an operational flowchart for an exemplary process of recommending emotion icons according to at least one embodiment.

Referring now to FIG. 2, an operational flowchart for an illustrative process 200 for improved recommending of emotion icons according to at least one embodiment is provided. The operational flowchart 200 in FIG. 2 will also be described with reference to the illustrative filter workflows described in FIG. 3.

At 202, emotion icon recommendation program 150 may detect text associated with user activity within a connected messaging environment. In embodiments, emotion icon recommendation program 150 may be employed with and connected to any suitable messaging environment, such as for example, a messaging platform within an associated application. In the context of this disclosure, user activity refers to any actions taken by a user on a connected messaging environment that results in the generation of text within the connected messaging environment. For example, at step 202, emotion icon recommendation program 150 may detect exemplary text 'T1' associated with user activity of an exemplary user 'U1' within a connected messaging environment 'Messaging Platform 1' that is part of an exemplary application.

Figure 3:
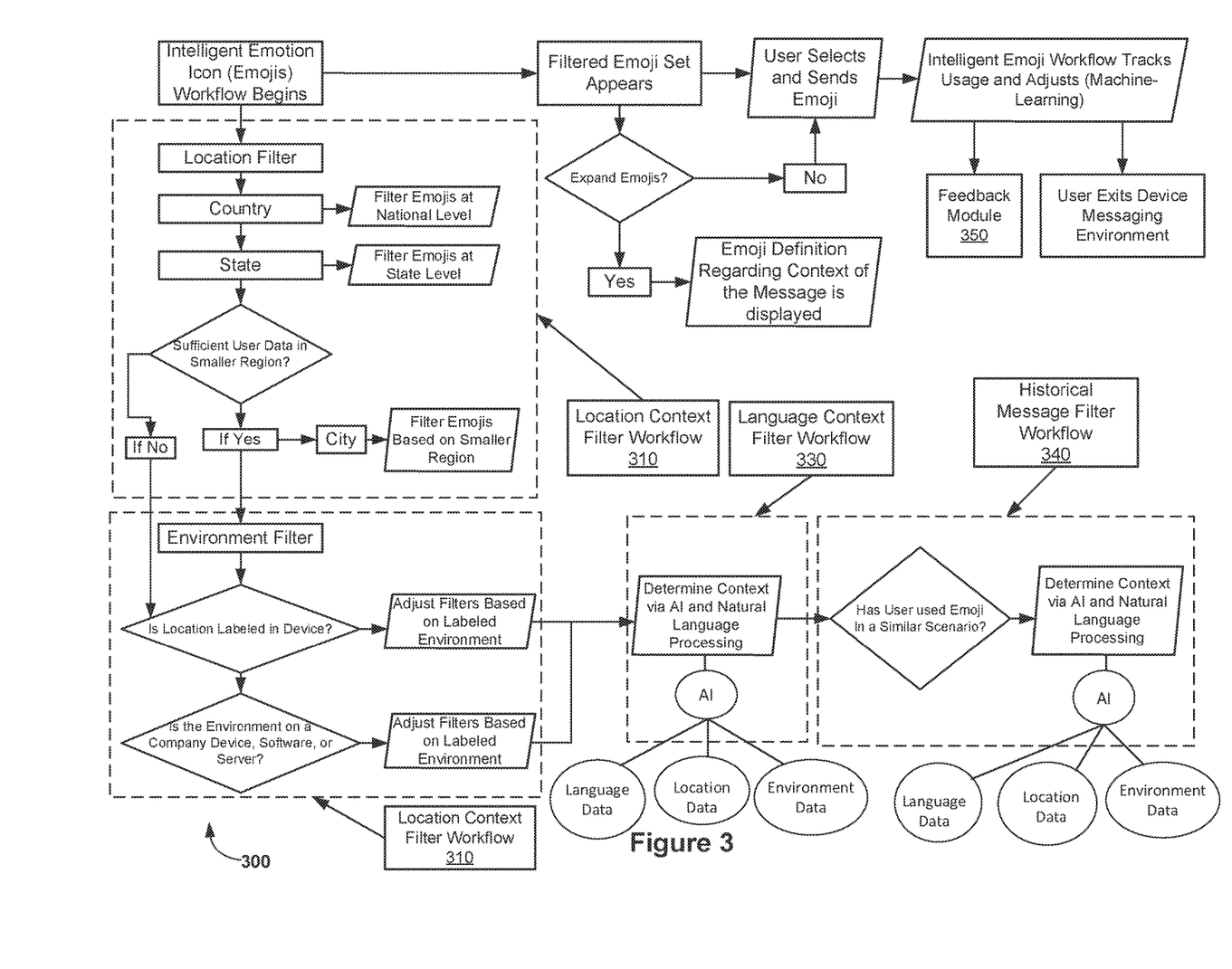
FIG. 3 illustrates exemplary an operation flowchart and illustrative filter workflows that may be employed by described embodiments to perform exemplary processes of recommending emotion icons according to at least one embodiment.

Next, at 204, emotion icon recommendation program 150 may, in response to detecting the text associated with user activity within the connected messaging environment, determine a context for the detected text based on at least location data, environment data, language context data, and historical data. This step involves combining multiple types of data to help emotion icon recommendation program 150 to determine a context for the detected text that may be leveraged at subsequent steps to generate and predict a series of appropriate and relevant emotion icons. Accordingly, the obtaining and processing of each type of data by emotion icon recommendation program 150 will be discussed in greater detail below. FIG. 3 depicts, among other things, exemplary filter workflows that may be employed by described embodiments to determine the context for a given detected text. The exemplary workflows in FIG. 3, while referenced below, are merely illustrative and non-limiting. In FIG. 3, the term 'emojis' is a shorthand term synonymous with the terms 'emotion icons' and 'emoticons', each of which may be used interchangeably.

To obtain and process relevant location data, an exemplary emotion icon recommendation program 150 may be configured to implement a location filter workflow. In embodiments, emotion icon recommendation program 150 may be configured to implement an exemplary location filter workflow (See for example, 'Location Filter Workflow 310' of FIG. 3) to filter emotion icons (emojis) based on the location of a user associated with detected text. In the context of step 204, the term 'filtering' refers to a process of narrowing down and selecting relevant emotion icons based on data associated with the location of the user. In embodiments, an exemplary location filter workflow implemented by emotion icon recommendation program 150 may filter emotion icons based on data related to a given relevant country. For example, if an exemplary detected text 'T1' includes the term 'hello', emotion icon recommendation program 150 may implement a location filter that determines that the United States is a relevant country, and the filter may identify an emotion icon 'E1' including a waving hand, as this would signify a non-verbal greeting in the relevant country. Similarly, an exemplary location filter workflow implemented by an exemplary emotion icon recommendation program 150 may be configured to filter emotion icons based on data related to a given state, city, or any other relevant location type having associated and useful data that may be leveraged to filter appropriate and relevant emotion icons. In embodiments, exemplary location filter workflow implemented by emotion icon recommendation program 150 may be configured to leverage location data including, for example, relevant definitions, slang, or characteristics of a given region or location when filtering relevant emotion icons. For example, an exemplary location filter workflow implemented by emotion icon recommendation program 150 may filter a statue of liberty emotion icon, or a taxi emotion icon for detected text related to an exemplary user that is in New York City. The location of a given user may be obtained by an exemplary location filter workflow implemented by emotion icon recommendation program 150 from any suitable source, such as for example, a device of the user or through the connected messaging environment via an associated application for which the user has granted location data access or permissions.

To obtain and process relevant environment data, an exemplary emotion icon recommendation program 150 may be configured to implement an environment filter workflow (See for example, 'Environment Filter Workflow 320' of FIG. 3) to filter emotion icons (emojis) based on the environment in which the detected text is to be sent. This allows emotion icon recommendation program 150 to filter emotion icons based on what is relevant or appropriate within a variety of environments. For example, an exemplary emotion icon recommendation program 150 may be configured to implement an environment filter workflow that is configured to determine whether the environment in which the detected text is to be sent is in a business or company environment, such as on a company device, software, or server (such as, for example, a given company workstation, a given company email server, or another company device). In embodiments, an exemplary environment filter workflow may be configured to determine if a detected location marked within a device or connected messaging environment is labeled. For example, a given detected text may be associated with a device or messaging environment that has a location label corresponding to locations such as 'Work', 'Office', 'School', 'Home' etc. Based on these labels, an exemplary environment filter workflow of icon recommendation program 150 may further filter emotion icons and emojis based on what is appropriate or relevant within a given environment.

To obtain and process language context data, emotion icon recommendation program 150 may be configured to implement an exemplary language context filter workflow (See for example, 'Language Context Filter Workflow 330' of FIG. 3) to filter emotion icons based on the language context of the detected text. In embodiments, emotion icon recommendation program 150 may be configured to leverage any suitable natural language processing techniques, suitable artificial intelligence (AI) tools, suitable neural networks, and any further suitable machine learning techniques to determine language context of the detected text. For example, in embodiments, an exemplary language context filter workflow implemented by emotion icon recommendation program 150 may be configured to leverage a Long Short-Term Memory (LSTM) network to determine the language context. This allows emotion icon recommendation program 150 to learn and consider long-term dependencies and sequence predictions. LSTM leveraged by exemplary emotion icon recommendation program 150 may further include feedback connections, unlike conventional feed-forward neural networks. In embodiments, this may allow for an exemplary emotion icon recommendation program 150 to process not only single data points (such as text) but also complete data streams (such as images, voice, and video). In embodiments, the LSTM network leveraged by exemplary emotion icon recommendation program 150 may be trained on a large dataset of messages and emotion icon usage associated with each message to learn the context of the message based on language processing and other determinants, such as the other data points discussed above for determining the context (overall context referenced at step 204) of the detected message, including, but not limited to location data, environment data, and historical data (further discussed below). As will be discussed below in connection with step 208, the trained LSTM model may then be used by emotion icon recommendation program 150 to predict the most appropriate emotion icons to generate a filtered series of emotion icons based on the context for the detected text. Returning to the obtaining and processing of language context data, if for example, the detected text states "I'm feeling happy today" in the connected messaging environment, the LSTM network may predict that the appropriate emotion icon to use in this context is a 'smiling face' emotion icon, as the language context of the word 'happy' is a positive emotion typically associated with the non-verbal act of smiling.

After obtaining and processing the location data, environment data, and language context data, emotion icon recommendation program 150 may further obtain and process historical data (See Historical Message Filter Workflow 340 of FIG. 3) to further filter emotion icons to be recommended based upon which emotion icons the user has selected for the detected text (or similar historical text) in past messaging instances. For example, if the detected text states "I'm feeling sad today", and the user has historically inserted a specific 'single tear' emotion icon having a face with a frown and a singular teardrop on the face in 8 other instances relating to text that is associated with negative or sad emotions, then emotion icon recommendation program 150 may determine that the 'single tear' emotion icon is likely an appropriate recommendation for the detected text "I'm feeling sad today" for that user.

As discussed above, at step 204, in response to detecting the text associated with user activity within the connected messaging environment, emotion icon recommendation program 150 determines a context for the detected text based on at least the location data, the environment data, the language context data, and the historical data, each of which is discussed above. Thus, the determined context for the detected text is dependent upon a variety of datapoints that may be leveraged and used to fill conventional knowledge gaps in historical emotion icon recommendation processes. In subsequent steps, emotion icon recommendation program 150 may now leverage suitable AI tools to predict and generate recommended emotion icons based on this determined context for the detected text. This process will be discussed now below in connection with step 206.

At step 206, emotion icon recommendation program may generate a filtered series of emotion icons based on the context. At this step, emotion icon recommendation program 150 may leverage suitable AI tools, such as for example, the LSTM discussed above, to generate a filtered series of predicted most relevant and most appropriate emotion icons based on the context. Thus, the generated filtered series of emotion icons will contain recommended emotion icons based on the location data, environment data, language context data for the detected text, as well as the historical data associated with the user associated with the detected text. This allows for emotion icon recommendation program 150 to predict emotion icons based on combinations of a variety of complex factors. For example, if considering the detected text "I'm so sick of this weather ○ ❄ " (the message including a 'sun' and 'snowflake' emotion icon after the word 'weather') an exemplary LSTM employed by emotion icon recommendation program 150 may recognize that the word "sick" in the detected text likely implies a negative sentiment, and the presence of both the sun and snowflake emotion icons suggests a feeling of frustration or confusion towards the weather. Based on this context, emotion icon recommendation program 150 may leverage the LSTM of to predict that a most-suitable alternative emotion icon that better reflects the intended meaning, may include a cloud or umbrella emotion icon, as these emotion icons are associated with the language context of the detected text, and the historical data for the user may indicate that cloud and umbrella emotion icons are frequently used by the user in connection with messages associated with frustrated or other negative emotions in the context of messages related to weather.

In other examples, an exemplary LSTM networks employed by emotion icon recommendation program 150 may be used to filter recommended emotion icons based on the context to avoid misinterpretations based on different demographics, cultures, and locations. In other embodiments, emotion icon recommendation program 150 may leverage an LSTM network to provide warnings or prompts to a user of emotion icons that may have multiple meanings based on evolution of symbolism and sematic meaning. In other embodiments, an LSTM network leveraged by emotion icon recommendation program 150 may allow for real-time tracking and testing of emotion icon relevance, continuous relevancy measurement, identification of gaps where a new emotion icon is needed, and personalization based on user demographics and message history. While certain uses are described above, many other uses of emotion icon recommendation program 150 are envisioned based on the ability of emotion icon recommendation program 150 to leverage AI tools, such as an LSTM network, to determine a context based on a variety of factors and predict and generated filtered emotion icons to recommend to a user. In embodiments, emotion icon recommendation program 150 may be further configured to determine a score for each emotion icon in the generated filtered series of emotion icons. The determined score may be a numerical representation of the predicted most appropriate and most relevant emotion icons in the generated filtered series of emotion icons based on the determined context of the detected text. In some embodiments, the determined score may be normalized and converted into a user-friendly representation for purposes of displaying the score to a user as a confidence score or percentage value between 0 and 10, where a score of 10 corresponds to complete confidence. In other embodiments, emotion icon recommendation program 150 may be configured to determine a score that is a numerical representation of the likelihood that a given emotion icon will be misinterpreted based on comparing the given emotion icon to the determined context. This score may be normalized (for optional displaying) and leveraged by the LSTM when recommending emotion icons to the user.

At 208, emotion icon recommendation program 150 may display the filtered series of emotion icons to a user for selection. The generated filtered series of emotion icons may be displayed within the connected messaging environment using any suitable methods. In embodiments, emotion icon recommendation program 150 may display any desired number of emotion icons from the generated filtered series of emotion icons within a user interface (UI) of the connected messaging environment. A user may then subsequently select a given recommended emotion icon to insert into their digital communication or message. In embodiments in which only a certain number of emotion icons may be displayed at one time, emotion icon recommendation program 150 may be configured to selectively display a series of highest-scoring emotion icons based on the context of the detected text. In some embodiments, emotion icon recommendation program 150 may be further configured to generate and display explainability statements for each recommended emotion icon in the generated filtered series of emotion icons. The explainability statements may contain any desired information from the determined context described above in connection with step 204. For example, if a displayed series of filtered emotion icons includes a 'statue of liberty' emoji 'E1', in embodiments, emotion icon recommendation program 150 may generate and display an explainability statement for emotion icon 'E1' that explains the definition or meaning of the emotion icon and how it relates to the determined context for the detected text. For example, if the detected text related to New York City, emotion icon recommendation program 150 may generate and display an explainability statement that explains that the Statue of Liberty is a New York City Landmark that has high popularity and is strongly associated with the city. In embodiments, emotion icon recommendation program 150 may be configured to display the explainability statement for a given recommended emotion icon in response to detecting a user interaction with the user interface of the connected messaging environment. For example, emotion icon recommendation program 150 may display the explainability statement for a given recommended emotion icon in response to detecting a user has continuously pressed down on (for example, by selecting and holding their finger down on a given emoji or emotion icon) a given recommended emotion icon within the user interface of the connected messaging environment.

At 210, emotion icon recommendation program 150 may detect user selection data associated with user-selected emotion icons. User selection data may include not only which emotion icon a user selects and sends in a digital communication, but also which emotion icons were rejected, and which emotion icons the user may have interacted with for the purpose of obtaining any available additional information or explainability statements as described above.

Thereafter, at 212, emotion icon recommendation program 150 may store the detected user selection data and associated context data. In some embodiments, for example, emotion icon recommendation program 150 may further include a feedback module (See for example, feedback module 350 in FIG. 3) configured to gather the detected user selection data and associated context data (context data associated with the detected text corresponding to a given selected emotion icons) as user feedback. This user feedback may then be stored in any suitable database or storage component as additional historical data for improving future predictions and recommendations of emotion icons.

It may be appreciated that emotion icon recommendation program 150 has thus provided improved computer-implemented methods of recommending emotion icons by leveraging machine learning tools to process a variety of data for a given detected text to determine a context and then generating filtered series of emotion icons based on the determined context for the detected text. The filtered series of emotion icons may represent a series of emotion icons predicted to be most appropriate based on the determined context. Thus, described embodiments provide the ability to address various gaps in information considered when recommending emotion icons, such as, for example, location contexts, societal changes, evolution of common vernacular, historical data, and other available data, to promote a frictionless user experience in which proper emotion icons are recommended to communicate intended meanings of users in an appropriate manner. Furthermore, described methods may detect user selection data associated with user-selected emotion icons, and store the detected user selection data and associated contexts as user feedback that may be leveraged as historical data by described embodiments to improve subsequent determinations of context and most appropriate and relevant recommended emotion icons for a given detected text.

It may be appreciated that FIGS. 2 and 3 provide only illustrations of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for recommending emotion icons, the computer-implemented method comprising:

detecting text associated with user activity within a connected messaging environment;

in response to detecting the text associated with the user activity within the connected messaging environment, determining a context for the detected text based on at least location data, environment data, language context data, and historical data, wherein determining the context based on the location data further comprises determining a location of a device associated with the connected messaging environment, and determining emotion icons based on a location type and the location data, wherein the location data further comprises language characteristics of a given location, wherein determining the context based on the environment data further comprises determining whether a detected location marked within at least one of the device and the connected messaging environment is labeled with an environment, and determining emotion icons based on the environment, wherein determining the context based on the language context data further comprises using machine learning to determine language context of the detected text, wherein the machine learning is trained on a dataset of messages and emotion icon usage associated with each message to learn the context of the dataset of messages based on language processing, and wherein determining the context based on the historical data further comprises identifying emotion icons a user selected for the detected text and similar text in previous messaging;

generating a filtered series of emotion icons based on the determined context; and displaying the filtered series of emotion icons to a user for selection.

2. The computer-based method of claim 1, further comprising:

detecting user selection data associated with one or more user-selected emotion icons.

3. The computer-based method of claim 2, further comprising:

storing the detected user selection data associated with the one or more user-selection emotion icons and associated context data as user feedback.

4. The computer-based method of claim 1, wherein the context is determined by leveraging a Long Short-Term Memory (LSTM) network.

5. The computer-based method of claim 1, further comprising:

generating explainability statements associated with each displayed emotion icon within the displayed filtered series of emotion icons.

6. The computer-based method of claim 5, further comprising:
   detecting user interaction with at least one of the displayed emotion icons within the displayed filtered series of emotion icons; and
   in response to detecting the user interaction with at least one of the displayed emotion icons within the displayed filtered series of emotion icons, displaying to the user the generated explainability statement associated with the at least one displayed emotion icon corresponding to the detected user interaction.

7. The computer-based method of claim 1, wherein generating the filtered series of emotion icons based on the context further comprises leveraging a Long Short-Term Memory (LSTM) network to predict and output recommended emotion icons.

8. A computer system, the computer system comprising:
   one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
   detecting text associated with user activity within a connected messaging environment;
   in response to detecting the text associated with the user activity within the connected messaging environment, determining a context for the detected text based on at least location data, environment data, language context data, and historical data,
      wherein determining the context based on the location data further comprises determining a location of a device associated with the connected messaging environment, and determining emotion icons based on a location type and the location data, wherein the location data further comprises language characteristics of a given location,
      wherein determining the context based on the environment data further comprises determining whether a detected location marked within at least one of the device and the connected messaging environment is labeled with an environment, and determining emotion icons based on the environment,
      wherein determining the context based on the language context data further comprises using machine learning to determine language context of the detected text, wherein the machine learning is trained on a dataset of messages and emotion icon usage associated with each message to learn the context of the dataset of messages based on language processing, and
      wherein determining the context based on the historical data further comprises identifying the emotion icons a user selected for the detected text and similar text in previous messaging;
   generating a filtered series of emotion icons based on the determined context; and
   displaying the filtered series of emotion icons to a user for selection.

9. The computer system of claim 8, further comprising: detecting user selection data associated with one or more user-selected emotion icons.

10. The computer system of claim 9, further comprising: storing the detected user selection data associated with the one or more user-selection emotion icons and associated context data as user feedback.

11. The computer system of claim 8, wherein the context is determined by leveraging a Long Short-Term Memory (LSTM) network.

12. The computer system of claim 8, further comprising: generating explainability statements associated with each displayed emotion icon within the displayed filtered series of emotion icons.

13. The computer system of claim 12, further comprising:
   detecting user interaction with at least one of the displayed emotion icons within the displayed filtered series of emotion icons; and
   in response to detecting the user interaction with at least one of the displayed emotion icons within the displayed filtered series of emotion icons, displaying to the user the generated explainability statement associated with the at least one displayed emotion icon corresponding to the detected user interaction.

14. The computer system of claim 8, wherein generating the filtered series of emotion icons based on the context further comprises leveraging a Long Short-Term Memory (LSTM) network to predict and output recommended emotion icons.

15. A computer program product, the computer program product comprising:
   one or more computer-readable tangible storage medium and program instructions stored on at least one of the one or more computer-readable tangible storage medium, the program instructions executable by a processor capable of performing a method, the method comprising:
   detecting text associated with user activity within a connected messaging environment;
   in response to detecting the text associated with the user activity within the connected messaging environment, determining a context for the detected text based on at least location data, environment data, language context data, and historical data,
      wherein determining the context based on the location data further comprises determining a location of a device associated with the connected messaging environment, and determining emotion icons based on a location type and the location data, wherein the location data further comprises language characteristics of a given location,
      wherein determining the context based on the environment data further comprises determining whether a detected location marked within at least one of the device and the connected messaging environment is labeled with an environment, and determining emotion icons based on the environment,
      wherein determining the context based on the language context data further comprises using machine learning to determine language context of the detected text, wherein the machine learning is trained on a dataset of messages and emotion icon usage associated with each message to learn the context of the dataset of messages based on language processing, and
      wherein determining the context based on the historical data further comprises identifying emotion icons a user selected for the detected text and similar text in previous messaging;

generating a filtered series of emotion icons based on the determined context; and displaying the filtered series of emotion icons to a user for selection.

16. The computer program product of claim 15, further comprising:

detecting user selection data associated with one or more user-selected emotion icons.

17. The computer program product of claim 16, further comprising:

storing the detected user selection data associated with the one or more user-selection emotion icons and associated context data as user feedback.

18. The computer program product of claim 15, wherein the context is determined by leveraging a Long Short-Term Memory (LSTM) network.

19. The computer program product of claim 15, further comprising:

generating explainability statements associated with each displayed emotion icon within the displayed filtered series of emotion icons.

20. The computer program product of claim 19, further comprising:

detecting user interaction with at least one of the displayed emotion icons within the displayed filtered series of emotion icons; and in response to detecting the user interaction with at least one of the displayed emotion icons within the displayed filtered series of emotion icons, displaying to the user the generated explainability statement associated with the at least one displayed emotion icon corresponding to the detected user interaction.

* * * * *